United States Patent [19]

Dokuzovic et al.

[11] Patent Number: 4,804,543

[45] Date of Patent: Feb. 14, 1989

[54] NOVEL HYDROPHILIC PLASTICIZING SYSTEM AND CHEWING GUM CONTAINING SAME

[75] Inventors: Zdravko Dokuzovic, Mississauga; Zoltan Bodor, Pickering; Ramola Lewis, Toronto; Costantina Kostantelou, Markham, all of Canada

[73] Assignee: Warner-Lambert Company, Morris Plains, N.J.

[21] Appl. No.: 73,048

[22] Filed: Jul. 14, 1987

[51] Int. Cl.$^4$ .............................................. A23G 3/30
[52] U.S. Cl. ...................................................... 426/3
[58] Field of Search ........................................ 426/3–6, 426/613, 576

[56] References Cited

U.S. PATENT DOCUMENTS

| 2,886,446 | 5/1959 | Kramer | 426/5 |
| 3,894,154 | 7/1975 | Graff | 426/5 |
| 4,156,740 | 5/1979 | Glass | 426/3 |
| 4,233,319 | 11/1980 | Fritz | 426/3 |
| 4,271,197 | 6/1981 | Hopkins | 426/3 |
| 4,386,106 | 5/1983 | Merritt | 426/5 |
| 4,514,422 | 4/1985 | Yang et al. | 426/3 |

Primary Examiner—Jeanette Hunter
Attorney, Agent, or Firm—Gary M. Nath

[57] ABSTRACT

A hydrophilic plasticizing system which comprises a solution wherein gelatin is dissolved in a solution of sorbitol, glycerin and water and a chewing gum composition, which comprises: a chewing gum base, sweetening agent and the hydrophilic plasticizing system.

20 Claims, 7 Drawing Sheets

NOVEL HYDROPHILIC PLASTICIZING SYSTEM AND CHEWING GUM CONTAINING SAME

The present invention relates to a hydrophilic plasticizing system and particularly to one for use with a chewing gum composition. More particularly this invention relates to a chewing gum composition containing a premixture of sorbitol/gelatin/glycerin hydrophilic plasticizing system which composition is able to prepare a flexible chewing gum product having a firm texture and a method for producing the same.

Chewing gum compositions generally comprise a substantially water insoluble, chewable gum base, such as chicle or substitutes therefor including jetutong, and natural or synthetic elastomeric resins. Also incorporated within the chewing gum composition, besides flavoring liquids and sweetners are plasticizers or softeners which improve the consistency and texture of the gum.

Several deficiencies with conventional chewing gums using normal plasticizers or softeners have existed which deficiencies have heretofore only been partially eliminated.

One such deficiency is the long term stability of chewing gums containing glycerin or additional amounts of water, notably their lack of long term shelf stability resulting in a relatively storage unstable product. The prior art has shown the glycerin has been added to the chewing gum formulations as a humectant which also serves as a binder, or hydrophilic plasticizer to bind the large amounts of powder compounds added to the formulations, such as the sweetening and filler components. The use of water has also be employed to soften the formulations. While glycerin enabled the gum to be softened and its presence avoided evaporation of the water present in the gum formulations, the formulations generally required use of low humidity cold rooms to enable them to set up so that they could be scored and wrapped after several days of storage. Such glycerin formulations generally exhibit an ERH (equilibrium relative humidity) of around 15 to 30.

Equilibrium relative humidity (ERH) measurements are a means of identifying the susceptibility or propensity of the composition to moisture gain or loss, which in turn relates to the tendency for the gum to remain moisture-stable and to not dry out or become stale. When the product neither picks up nor loses moisture, it is in a state of equilibrium with the environment. The ERH measurement depends on the ratio of free moisture to bound moisture in a product and the temperature. The amount and rate at which a chewing gum loses or gains moisture depends on the differential between the product's ERH and ambient RH. The transfer of moisture will be in the direction from high to low RH until an equilibrium state is reached.

The environmental factor influencing moisture loss or gain is relative humidity. It is commonly accepted that the lower the relatie humidity, the faster things dry out. Relative humidity (RH) is a measure of the vapor pressure exerted by the moisture in the atmosphere. As relative humidity increases or decreases, the pressure of the moisture in the atmosphere increases or decreases accordingly. Pure water exerts a moisture vapor pressure equivalent to 100% RH. As such, water will evaporate when stored in any environment less than 100% RH. If impurities are added to that water, the moisture vapor pressure will decreases.

The formulations containing additional levels of water required special storage conditions to enable water to be evaporated from the formulations so that the product would be able to be processed properly.

For example, U.S. Pat. No. 4,035,572 involves a gum base formulation with less than 0.5% moisture. This low percentage of moisture is due to the purification process which removes water and solvent from the gum base.

U.S. Pat. No. 4,382,963 involves a low calorie chewing gum which uses polydextrose as the sole soluble bulking agent. The moisture content in the final produce is about 1 to 5% and this is obtained by omitting the aqueous component, e.g., sorbitol syrups or corn syrups, which is normally used in chewing gum products.

U.S. Pat. No., 3,262,784 concerns a chewing gum composition which has less than 1% moisture in the final product due to heating between about 170° and 250° F. to drive off the water.

U.S. Pat. No. 4,150,161 concerns a two component confection having a carbonated candy component and a pliable bubble gum component with each component having a controlled water activity between 0.1 to 0.3 and which is capable of surviving long periods of storage when packaged in a moisture resistant material.

In contrast, U.S. Patent 4,514,422 to Yang et al discloses the formation of a chewing gum composition which exhibits improved shelf life and resistance to staling. This patentee discloses that chewing gums and bubble gums have been prepared in the past, with the purpose in mind of extending shelf life. Characteristically, gums prepared and stored, even at room temperature for extended periods of time, tend to lose their moisture and elasticity, with the result that they become brittle, and initially crumble when they are placed in the mouth. This problem is particularly noticeable in the instance of sugarless gums, and particularly those gums that are stored in a dry atmosphere, i.e. an atmosphere having less than from 50 to 60% relative humidity.

Yang continues by stating that sugarless gums conventionally contain on the order of about 5% of water, and it was therefore theorized that brittleness or the phenomenon of staling results from the loss of that water, due to evaporation or otherwise, over time. Specifically, most sugarless gums contain large amounts of sorbitol, which serves conventionally as a sweetner, as well as a bulking aid. Sorbitol is known for its tendency to recrystallize in the presence of even small amounts of water, and its tendency to crystallize when the water in which it is dissolved is removed. It was therefore theorized by Yang et al that, as the water containing the sorbitol in the gum composition, is lost by evaporation or otherwise, the sorbitol crystallizes and thus promotes the embrittlement of the gum composition, which contributes to the staling phenomenon. Thus far, the only workable approach to prolonging gum composition freshness relied on the use of fin-seal packaging with water vapor impermeable laminates to exclude all external ambient atmosphere and accompanying moisture and conversely to prevent the egress of moisture from the package contents. This approach is noted as being very costly and has its limitations, as periodic package leakage permits staling to occur unabetted as before.

In accordance with the Yang et al disclosure, a gum composition having improved shelf life and resistance to staling is prepared which comprise a substantially anhydrous mixture of a gum base, at least one sugar alcohol, and glycerin, the glycerin present in an amount from about 8% to about 18% by weight of the gum composition. The gum composition is further characterized by containing no more than 2% by weight of water in any form. More particularly, the gum bases may contain no more than 3.5% by weight of water, the sugar alcohols may contain no more than 0.7% by weight of water and glycerin may contain no more than 1.0% by weight of water.

In addition to these ingredients, Yang et al also employed a variety of other materials, such as plasticizers, softeners and thickeners.

In addition to difficulties associated with addition of free water, problems have also arisen with the use of gelatin in chewing gums. Gelatin has been used as a thickener and is usually dispersed or dissolved in water. This is normally done by dissolving the gelatin in water in amounts of at least 2 parts water for each part of gelatin. It has been found however, that this intentional additional of water enhances the staling effect of the gum attributed to the water content present in the thickener system. See for example U.S. Pat. No. 4,233,319 to Fritz et al. Gelatin has also been used as an encapsulating material for flavors to prepare compositions having an extended flavor perception time, true flavor character and controlled release of the flavoring agent. See also U.S. Pat. Nos. 2,886,446 to Kramer et al, 4,292,336 to Latymer and 4,386,106 to Merritt et al.

Referring to the drawings.

Figure 1:
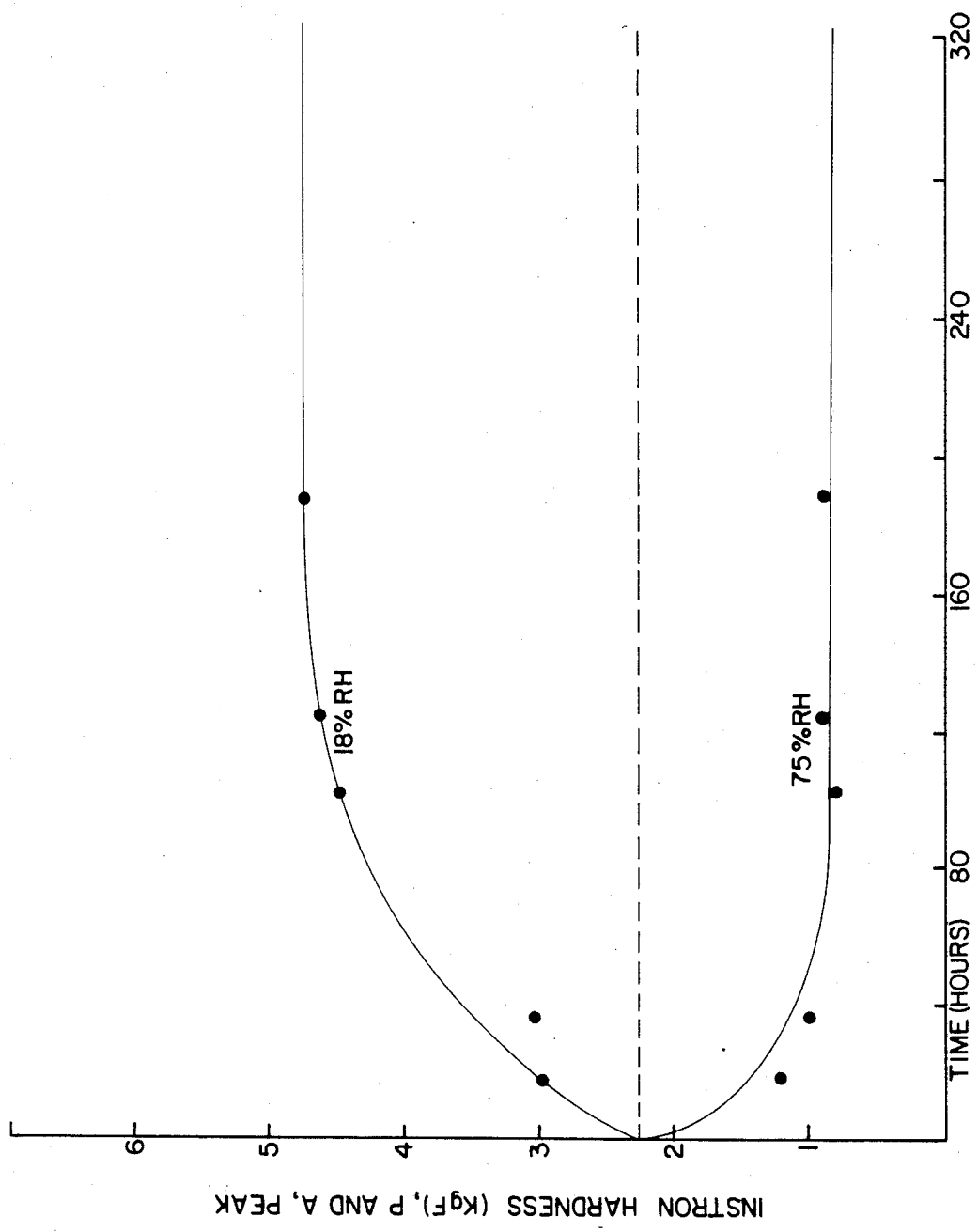
FIG. 1 represents the water exchange rate at 75% and 18% relative humidity for the comparative formulation of Example 1.

In accordance with the present invention a hydrophilic plasticizing system is prepared which comprises a solution which contains gelatic dissolved in a sorbitol and glycerin solution which system has improved utility as a hydrophilic component of a chewing gum composition. The chewing gum compositions of this invention containing the novel hydrophilic plasticizing system exhibit a balanced effect by reducing the chewing gums senstivity to moisture pickup while reducing the staling phenomenon normally associated with chewing gums containing water and/or glycerin humectant.

The inventive chewing gum formulations exhibit rapid processing resulting from a rapid setting base formulation and easy processing and handling resulting from the composition soft and pliable chewing gum consistence. In addition, the resulting chewing gum compositions have a consistent firm chew, that has a uniform chew character throughout the chewing period coupled with a higher level of flavor release and stabilization. The chewing gums also have relatively long storage stability without product deterioration. When the compositions are chewed, an initial firm chew characteristic is evidenced along with an even flavor/sweetness release.

The hydrophilic plasticizing system of this invention must contain sorbitol, gelatin, glycerin and water. Water is used in sufficient amounts to enable the gelatin to become fully hydrated and cause the system to gel. The water is normally employed with the sorbitol as a sorbo solution which may contain 70% sorbitol dissolved in 30% water. It should be recognized that sorbo solutions containing varying amounts of water are also contemplated in this invention along with crystalline sorbitol and separately added water.

Once prepared the hydrophilic plasticizing system may be blended into a chewing gum composition either prior to gel formation or after the gel has begun to polymerize. For ease of processing it is preferred to add the solution to a chewing gum composition prior to the gel setting up and thus enable the polymerization/hydration to be completed after addition to the composition. It should be recognized, however, that a gelled system may be added to the chewing gum composition as is or simply reheated to yield a flowable physical state and then added.

Once the hydrophilic plasticizing system of this invention is added to the chewing gum composition, the benefits of using the sorbitol/gelatin/glycerin system are obtained without their concurrent deficiencies, notably oversoftening of the gum with glycerin or hardening from the presence of sorbitol or enhanced staling with the gelatin solution. These formulations, once prepared may be easily processed and readily set up into forms that may be rolled, scored and packaged. They also provide a formulation which have a initial firm texture which assists in the rapid packaging of the product. Once prepared the chewing gum compositions are able to absorb minor amounts of moisture from the surrounding environment which aids in maintaining the chewing gum composition in having a soft chew character. The softening of the gum however is controlled with the presence of the gelatin which assures an acceptable firm texture even though flexibility does not significantly change from the initial pliable chewing gum piece.

The gelatin used in the hydrophilic plasticizing system of this invention can generally be selected from a wide variety of gelatins having a Bloom value of 100-250. The lower Bloom strength gelatins are preferred from both an economic point of view and the fact that higher Blooms have a tendency to give harder, "crunch" textures which are unacceptable to manufacturers and consumers of chewing gums. Gelatins having a Bloom strength of 250 or more have a tendency to give significant delayed flavor release and a concurrent gritty texture which is not acceptable to consumers. Preferably, lower Bloom strengths are employed to maximize the amount of gelatin used and to increase its binding of free water present in the sorbo solution. Higher Bloom strengths tend to result in the use of lower amounts of gelatin which cause an initial excessively hard chew character to the gum.

The gelatin is employed in the hydrophilic plasticizing system of this invention in an amount of about 2 to about 25% by weight and preferably from about 5 to about 10% by weight of the final system for sugarless chewing gums and about 5 to about 25% for sugar containing chewing gums. Amounts below about 2% fail to provide sufficient thickener impact upon gum texture, i.e. make a firm product and form an unacceptable flowable system whereas amounts above about 25% form a product which is too thick and when added to a gum is too hard and unable to be chewed.

The sorbitol used in the hydrophilic plasticizing system aids in increasing the ERH of the system to around 35 to 45. In the absence of sorbitol the gum would generally posses an ERH around 20 to 30 with a stabilizing system lacking the sorbitol. Such systems have been found unsuitable since the glycerin causes the gum to absorb moisture from the surrounding environment under most atmospheric conditions except specially controlled areas. In sugar and sugarless gums, the addition and/or loss of moisture results in recrystallization of the sweetners, such as sugar or sorbitol causing the gum to become hard and brittle. Sorbitol containing sugarless gums generally have an ERH between 55 and 65 and thus require special handling to curtail gum staling. The use of sorbitol in the present hydrophilic plasticizing system results in an optimized formulation that has reduced sensitivity to moisture and thus balances the rate of water exchange and the staling phenomenon or property. The sorbitol is used in amounts of about 20% to about 70% by weight of the final system. When the chewing gum is sugarless a preferred amount is from about 55% to about 63% by weight. In contrast sugar containing chewing gum preferably contains but 35% to about 55% by weight. Amounts below about 20% result in formulations that have higher moisture pickup resulting from increased glycerin contents. Amounts above about 70% result in higher rates of staling causes by insufficient glycerin contents.

The sorbitol may be added as a dry material, i.e. crystalline or as a solution. Suitable solutions include normally commerically available sorbo solutions that contain 70% sorbitol and 30% water although the exact amount of water present in the sorbo solution is not critical.

The glycerin component of the hydrophilic plasticizing system is used in amounts of about 3% to about 50% and preferably from about 5% to about 15% by weight of the final system for sugarless gums and about 20 to about 25% by weight for sugar containing chewing gums. Amounts below about 3% have been found to be unsuitable whereas amounts above about 50% tend to overly soften the gum and inhibit the beneficial affect sought by the presence of the gelatin.

In addition to the sorbitol, gelatin and glycerin, water must be employed in the present hydrophilic plasticizing systems to enable the gelatin to become hydrated. If the gelatin were to be employed as a powder it would not possess sufficient binding properties to function effectively. Likewise if merely added to water, and dissolved and then added to the gum compositions too much water is needed to dissolve the gelatin and the resulting product would become stale during storage.

The water is employed in the inventive system in amounts of about 6% to about 25% by weight and preferably from about 2.0 to about 27% by weight of the final system for sugarless gums and preferably from about 15 to about 20% by weight for sugar containing chewing gums.

The hydrophilic plasticizing system of the invention is prepared by mixing the gelatin with a preblend of the glycerin and sorbitol and then adding water to the mixture while mixing until the gelatin forms a homogenous fluid mixture. A preferred procedure involves adding the gelatin with mixing to a glycerin and sorbo solution premix. Vigorous mixing is preformed to avoid clumping of the gelatin. Once the addition is complete, the mixture is heated to between 40° C. and 85° C. Mixing is continued until the gelatin in no longer visible, that is a homogenous system is prepared. Once complete, the hydrophilic plasticizing system is either maintained at a temperature between about 40° C. and about 85° C. and preferably between 50° C. and about 80° C. and used or stored for future use. The system may also be permitted to gel at lower temperatures and be used or stored as such. If the use of the gelled form is unacceptable for use with a particular formulation, the gel may be simply reheated and used at temperatures again below about 85° C.

The hydrophilic plasticizing system may be employed in chewing gum compositions to provide a composition having excellent initial flavor release while enabling sufficient flexibility to the chewing gum product and permitting the product to have significantly reduced staling potential by reducing moisture loss. The system may be employed in amounts up to about 15% by weight of the final chewing gum composition and preferably in an amount of about 3% to about 15% by weight of the final chewing gum composition. The hydrophilic plasticizing system may be added to chewing gum compositions that contain water in amounts up to about 5% by weight of the final chewing gum composition. More particularly the chewing gum composition may be substantially anhydrous, that is one containing less than about 2% by weight water as well as compositions that contain water in amounts of about 2% to about 5% by weight. The water in the compositions is usually present as a component of the ingredients being added such as through glycerin emulsifiers (95% glycerin and 5% water) and so forth.

Since the hydrophilic stabilizing system is beneficial in providing the unexpected properties to sugar containing and sugarless containing chewing gum compositions it has wide applicability to the chewing gum art in aiding maintenance of flexibility and limiting moisture loss while permitting the formulations to have initial flavor impact. Thus the inventive system obtains the benefits of the use of these materials described in the art without having their concurrent disadvantages.

As discussed above the inventive chewing gum compositions have an average ERH and therefore would not tend to lose moisture, since the RH of most geographic regions is between 35-45% depending on the time of year. If the ERH of the chewing gum is greater than the ambient relative humidity, the gum will lose moisture and dry out. The ERH range of the inventive compositions, however, are between about 35% and about 45%, and preferably at room temperature, e.g. about 23° C. Thus, there is little tendency for chewing gum made from the inventive compositions to dry out. Moisture pickup would not be detrimental to such formulations in view of the presence of relatively high amounts of glycerin. Thus, a delicate moisture balance is maintained whereby the product's ERH is maintained at a suitable value relative to the ambient relative humidity. Thus, the advantages of the instant chewing gum compositions of long shelf life and freshness stability, is believed to be due to the critical aspects of:

(a) the hydrophilic plasticizing system containing specific ingredients used in the chewing gum formulations; and (b) maintaining the ERH of the chewing gum composition at a normal level with the ambient relative humidity.

Chewing gum formulations in which the novel hydrophilic plasticizing system may be employed are not critical and contain the usual ingredients. As described above the formulations may be either sugar containing or sugarless chewing gum compositions. In general, useful amounts of gum base may vary from about 5% to about 60% by weight of the final chewing gum composition, with preferred amounts being about 15% to about 40% by weight and most preferably about 15% to about 25% by weight. The gum base may be any water-insoluble gum base well known in the art. Illustrative examples of suitable polymers useful in gum base include both natural and synthetic elastomers and rubbers. For example, those polymers which are suitable in gum bases, include, without limitation, substances of vegetable origin such as chicle, jelutong, gutta percha and crown gum. Synthetic elastomers such as butadiene-styrene copolymers, isobutylene-isoprene copolymers, polyethylene, polyisobutylene and polyvinylacetate and mixtures thereof, are particularly useful.

The gum base composition may contain elastomer solvents to aid in softening the rubber component. Such elastomer solvents may comprise methyl, glycerol or pentaerythritol esters of rosins or modified rosins, such as hydrogenated, dimerized or polymerized rosins or mixtures thereof. Examples of elastomer solvents suitable for use herein include the pentaerythritol ester of partially hydrogenated wood rosin and partially hydrogenated wood rosin, pentaerythritol ester of wood rosin, glycerol ester of wood rosin, glycerol ester of partially dimerized rosin, glycerol ester of polymerized rosin, glycerol ester of tall oil rosin, glycerol ester of wood rosin and partially hydrogenated wood rosin and the partially hydrogenated methyl ester of rosin, such as polymers of alpha-pinene or beta-pinene, terpene resins including polyterpene and mixture thereof. The solvent may be employed in an amount ranging from about 10% to about 75% and preferably about 45% to about 70% by weight to the gum base.

A variety of traditional ingredients such as plasticizers or softeners such as lanolin, stearic acid, sodium stearate, potassium stearate, glyceryl triacetate, glycerine and the like may be employed in the gum base. Useful waxes, for example, natural waxes, petroleum waxes such as polyurethane waxes, paraffin waxes and microcrystalline waxes may also be incorporated into the gum base to obtain a variety of desirable textures and consistency properties. These individual additional materials are generally employed in amounts of up to about 30% by weight and preferably in amounts of from about 3% to about 20% by weight of the final gum base composition.

The chewing gum composition may also include the conventional additives such as softeners and plasticizers as discussed above as well as flavoring agents; coloring agents such as titanium dioxide; emulsifiers such as lecithin and glyceryl monostearate; and additional fillers such as aluminum hydroxide, alumina, aluminum silicates, calcium carbonate, and talc. Combinations of these conventional additives are contemplated. These fillers may also be used in the gum base in various amounts. Preferably the amount of fillers when used will vary from about 4% to about 30% by weight of the final chewing gum.

The chewing gum compositions should also include the use of sweeteners well known in the art.

The sweetening agent may be selected from a wide range of materials including water-soluble agents, water-soluble artificial sweeteners, and dipeptide based sweeteners, including mixtures thereof. Without being limited to particular sweeteners, representative illustrations encompass:

A. Water-soluble sweetening agents such as monosaccharides, disaccharides and polysaccharides such as xylose, ribose, glucose, mannose, galactose, fructose, dextrose, sucrose, sugar, maltose, partially hydrolyzed starch, or corn syrup solids and sugar alcohols such as sorbitol, xylitol, mannitol, maltitol, hydrogenated starch hydrolysate, and mixture thereof.

B. Water-soluble artificial sweeteners such as the soluble saccharin salts, i.e., sodium or calcium saccharin salts, cyclamate salts, acesulfam-K, sucralose and the like, and the free acid form of saccharin.

C. Dipeptide based sweeteners such as L-aspartylL-phenylalanine methyl ester and materials described in U.S. Pat. No. 3,492,131, L-D-aspartyl-N-(2,2,4,4-tetramethyl-3-thietazyl)-D-alaninamide hydrate, and the like.

In general, the amount of sweetener will vary with the desired amount of sweetener selected for a particular chewing gum. This amount will normally be about 0.001% to about 90% by weight of the final chewing gum composition when using an easily extractable sweetener. The water-soluble sweeteners described in category A above, are preferably used in amounts of about 25% to about 85% by weight, and most preferably from about 50% to about 65% by weight of the final chewing gum composition. In contrast, the artificial sweeteners described in categories B and C are used in amounts of about 0.005% to about 5.0% and most preferably about 0.05% to about 2.5% by weight of the final chewing gum composition. These amounts are ordinarily necessary to achieve a desired level of sweetness independent from the flavor level achieved from flavor oils.

The colorants useful in the present invention, include the pigments such as titanium dioxide, which may be incorporated in amounts of up to about 10% by weight, and preferably up to about 6% by weight. Colorants may also include dyes suitable for food, drug and cosmetic applications. These colorants are known as F.D.&C. dyes. The materials acceptable for the foregoing spectrum of uses are preferably water-soluble. Illustrative examples include indigo dye, known as F.D.&C. Blue No. 2, which is the disodium salt of 5,5'-indigotin-di-sulfonic acid. Similarly, the dye known as F.D.&C. Green No. 1, comprises a triphenylmethane dye and is the monosodium salt of the 4-[4-Nethyl-p-sulfobenzylamino) diphenylmethylene]-[1-(N-ethyl-N-P-sulfobenzyl)-2, 5-cyclohexadienimini]. A full recitation of F.D.&C. and D.&C. colorants and their corresponding chemical structure may be found in the Kirk-Othmer Encyclopedia of Chemical Technology, in Volume 5, at pages 857–884.

The chewing gum compositions of this invention, may contain effective amounts of a maltodextrin or a modified maltodextrim. Modified maltodextrins are described in U.S. Pat. No. 4,497,832 and have low bulk densities in comparison to conventional maltodextrins. For example, a modified maltodextrin can have a bulk density in the range of about 2.0 to 25 lbs/ft.$^3$ and preferably about 3.0 to about 6.0 lbs/ft.$^3$. Such materials when used in amounts of about 0.1 to about 12% by weight have been found useful in aiding for the quick release of flavoring liquids from the formulation.

All of the techniques associated with the preparation of the chewing gum products in the forms taught are well known and the present method may vary somewhat depending upon the specific end product to be manufactured without departing from the essential parameters of the invention. Such other details are presented for purposes of illustration, and provide a best mode for the practice of the invention, and therefore the invention should not be limited to those parameters.

A preferred process of preparing a chewing gum composition involves: (a) admixing a chewing gum base at a temperature from about 60° C. to about 90° C. with a softener to obtain a homogenous pliable mixture; (b) while mixing, incrementally add to the homogenous pliable mixture the sweetening agent until a homogenous mass is prepared; (c) the hydrophilic plasticizing system is then added while mixing is continued and then the remaining chewing gum ingredients are added and mixed until a uniform mass is obtained; and (d) thereafter the mixture is formed into suitable chewing gum shapes. The chewing gums of the invention may be in any form known in the art, such as stick gum, slab gum, chunk gum, shredded gum, hard coated gum, tabletted gum, as well as center-filled gum.

The following examples serve to provide further appreciation of the invention but are not meant in any way to restrict the effective scope of the invention. All percentages throughout the specification are by weight % of the final chewing gum composition unless otherwise indicated.

EXAMPLE 1

This Example demonstrates the preparation of chewing gum compositions containing the novel hydrophilic plasticizing system of this invention compared with a normal glucose plasticized chewing gum.

Chewing gum pieces were prepared using the formulations set forth in Table I by mixing a molten gum base with $CaCO_3$ filler, and lecithin emulsifier until a homogenous mixture is obtained. To this mixture is added the plasticizers and while mixing, the remaining ingredients were blended into the formulation until a homogenous mixture is formed. These formulations were then prepared into chewing gum pieces.

The chewing gum pieces were subjected to a stability test at two different conditions: a) 18% relative humidity at 18° C. for 320 hours and b) 75% relative humidity at 25° C. for 320 hours. An Instron instrument with a 5/16 inch probe at a speed of 12 millimeters per minute and a load range of 10 kilogram force was used to determine the chewing gum piece hardness. Hardness values are used to indicate the relative degree of flexibility due to maintenance of water exchange to and from the gum piece and the environment. Variations in hardness values indicate changes in flexibility and softness, which directly relates to water loss or gain in the gum piece. Lower rates of water exchange are reflected by lower rates of change in hardness, which are indicative of a more stable chewing gum in the terms of retention of texture, softeness, freshness and other properties characteristic of prolonged shelf-life. The results are set forth in FIGS. 1 and 2 and demonstrate the rate of water exchange under both conditions. The inventive formulation in FIG. 2 showed significant reductions in rates of water exchange under both conditions as evidenced by reduced rates of hardness change.

Figure 2:
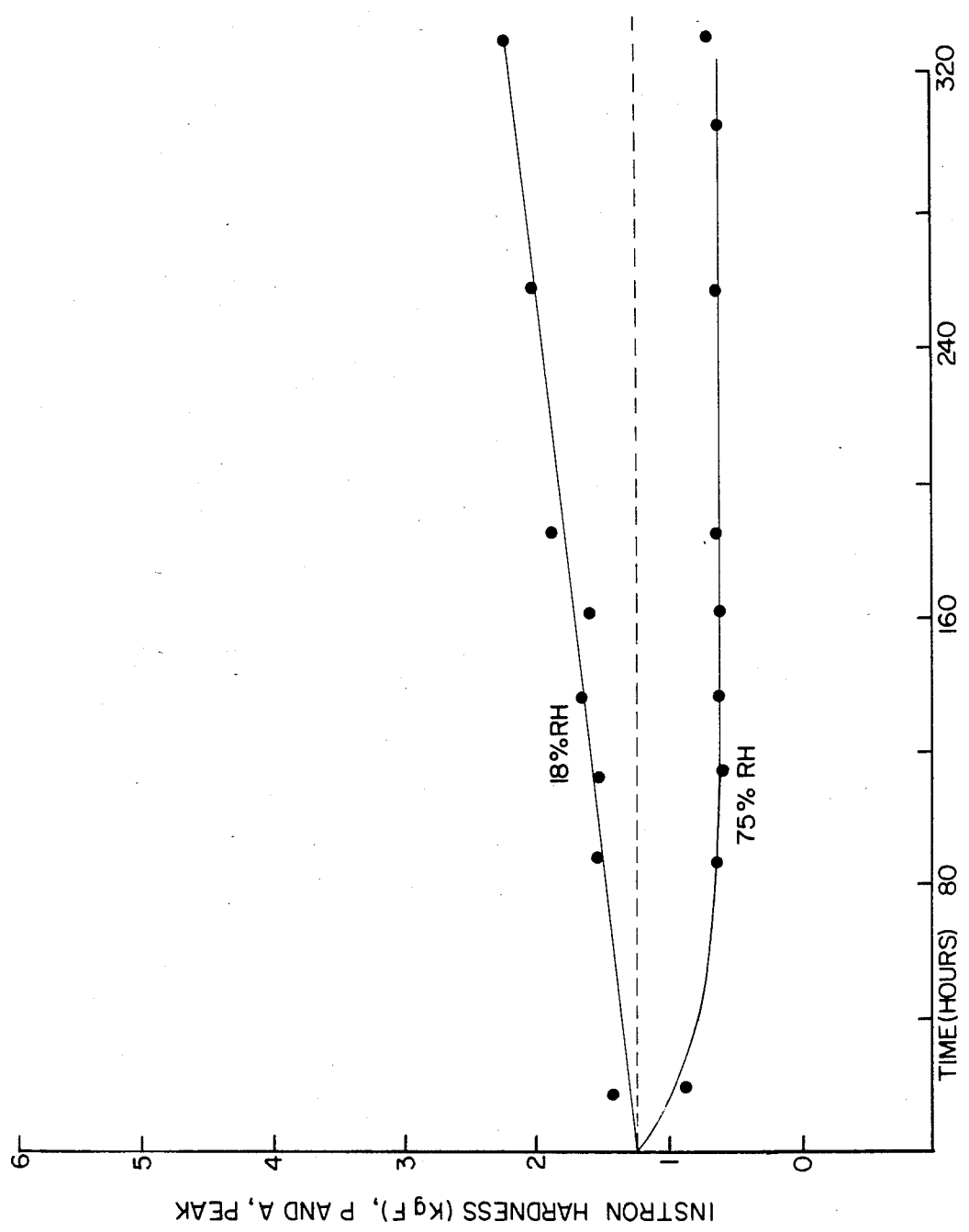
FIG. 2 represents the water exchange rate at 75% and 18% relative humidity for inventive formulation of Example 1.

FIG. 1 shows that the comparative formulation achieved minimum hardness (maximum water pickup) of 0.8 KgF (kilogram-force) within 100 hours at 75% RH and 25° C. This represents a 64% decrease from the initial hardness level. The inventive formulation, FIG. 2, on the other hand, achieved a hardness value of 0.7 KgF representing a 44% change from the initial state during the same period of time at the same conditions. It is apparent from the graph that the inventive formulation exhibits less tendency to pickup water under conditions of high humidity, whereas the prior art (commercially available) control gum clearly exhibited a tendency to absorb moisture from the surrounding environment.

Additionally, FIG. 1 demonstrates that the control composition exhibits a significantly greater rate of hardness change (100% change) over time than the inventive formulation (FIG. 2, 44% hardness change) for the same period of time (160 hours).

TABLE I

Sugar Chewing Gum Compositions

| | Inventive | Comparative |
|---|---|---|
| Gum Base | 17.6 | 17.2 |
| Filler | 4.4 | 3.0 |
| Lecithin | 0.3 | — |
| Sugar, pulverized | 65.3 | 64.7 |
| Hydrophilic plasticizer system | 8.0* | 13.5** |
| Flavor mix | 1.6 | 1.6 |
| MCP encapsulated flavor | 2.0 | — |
| Sweetener (aspartame) | 0.8 | — |

*Represents a mixture of:
| | |
|---|---|
| Sorbitol sol. (70%) | 5.12 |
| Glycerin | 1.84 |
| Gelatin (100 Bloom) | 0.96 |
| Modified maltodextrin | 0.08 |

**Represents corn syrup only

EXAMPLE II

This example demonstrates the preparation of sugarless chewing gum compositions containing the novel hydrophilic plasticizer system (a premixture of sorbitol solution, glycerine and gelatin) of this invention compared with a sugarless formulation containing either glycerin alone or sorbitol alone. The formulations were prepared as in Example 1 and are set forth in Table II.

Figure 3:
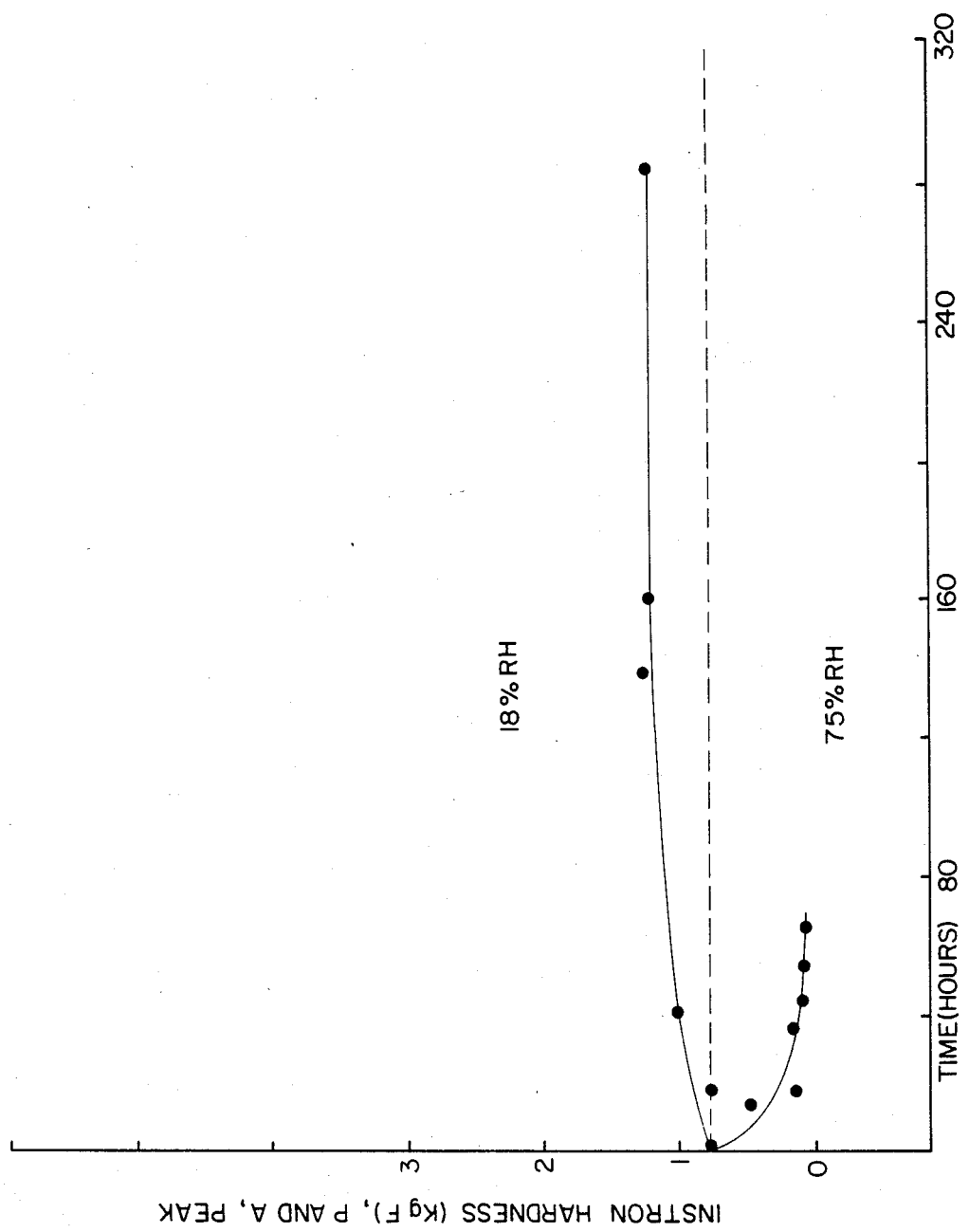
FIG. 3 represents the water exchange rate at 75% and 18% relative humidity for the first comparative formulation of Example 2.

The chewing gum pieces were subjected to stability tests at the two conditions set forth in Example 1 according to the procedure of Example 1. The results which are set forth in FIGS. 3, 4, and 5 diagram the rate of water exchange under both high and low humidity conditions. The glycerine-containing sugarless comparative formulation 1 (Table 2) was observed to pick up moisture at a rapid rate at the high humidity condition. The gum pieces showed visible moisture on the surface, i.e., dewing, at the end of the first 10 hours of storage. The rate of moisture absorption was evidenced by the rapid decrease of Instron hardness as shown by the lower portion of the hardness curve against time (FIG. 3). At the Instron value of 0.25 KgF, the gum texture was found to be unacceptable for chewing (fell apart on chewing) and the testing was terminated.

The inventive gum formulation containing the hydrophilic plasticizing system was observed to absorb moisture and to soft at a significantly reduced rate. The lower hardness curve, representing the hardness change with time at 75% RH, high humidity condition, shows much slower decrease in hardness (FIG. 5) with time as compared to the Comparative I formulation (FIG. 3). The gum pieces examined for dewing retained their satisfactory chew and texture qualities for up to 80 hours.

Figure 4:
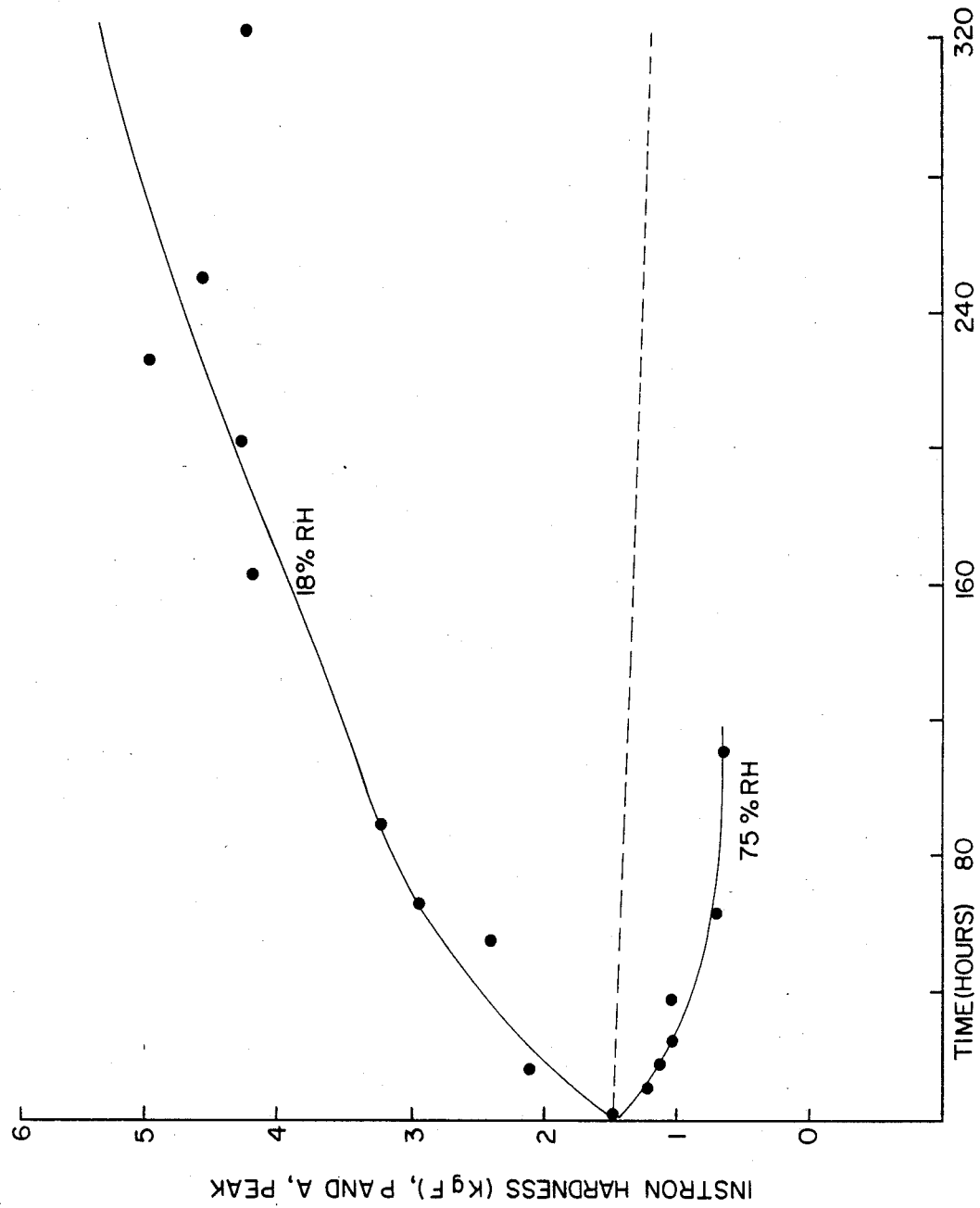
FIG. 4 represents the water exchange rate at 75% and 18% relative humidity for the second comparative formulation of Example 2.
Figure 5:
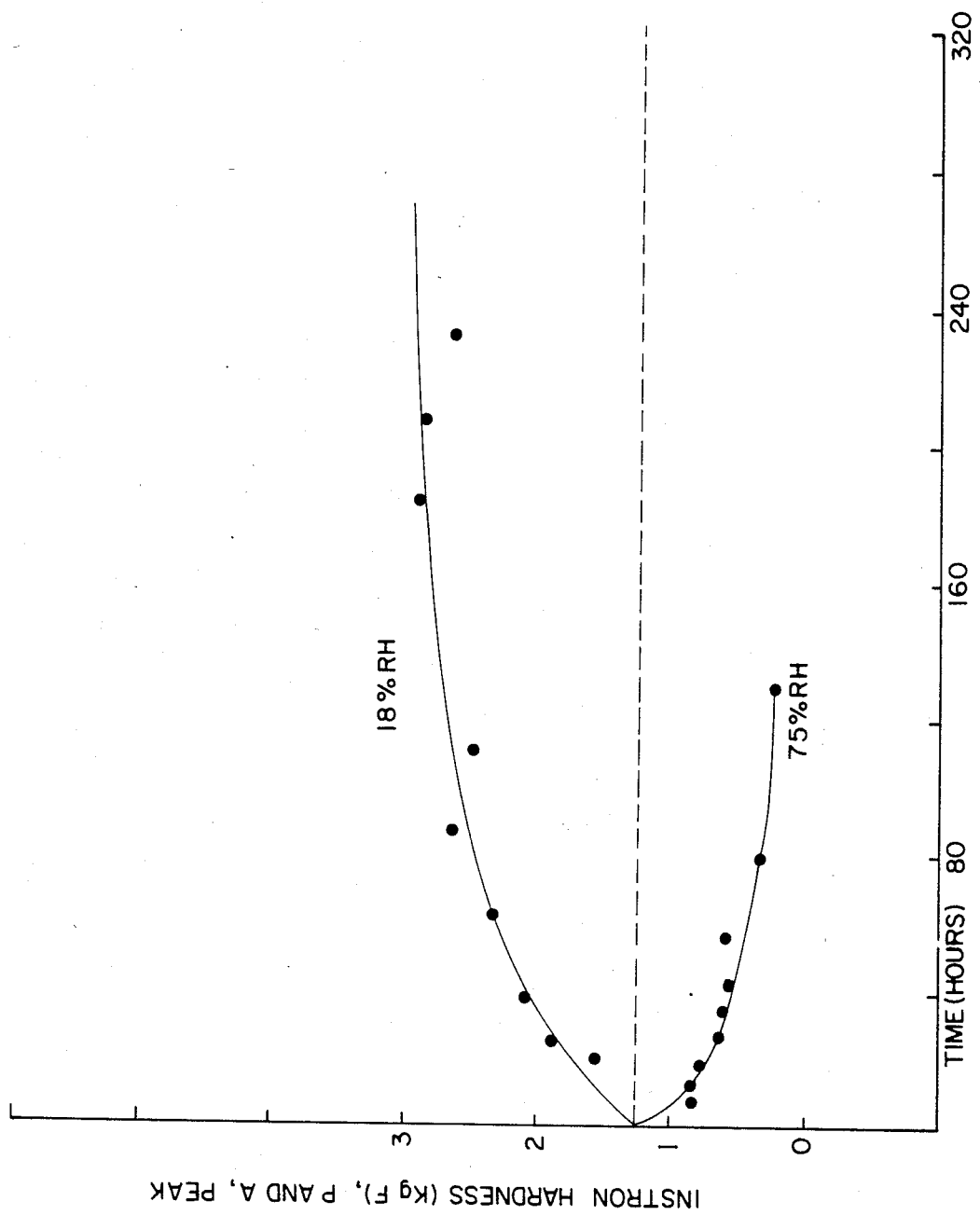
FIG. 5 represents the water exchange rate at 75% and 18% relative humidity for the comparative formulation (commercially available Dentyne® chewing gum) in Example 3.

At the low humidity storage conditions of 18% relative humidity, the inventive formulation showed significantly reduced rate of hardness increase, known also by the term "staling", as compared to the 'Comparative 2' formulation (Table 2, FIG. 4). The inventive formulation containing the hydrophilic plasticizer system is shown as the upper curve in FIG. 5. The rate of hardness change has stabilized at a final Instron hardness of approximately 3 KgF.

The comparative composition, formulation II containing only sorbitol solution as a hydrophilic plasticizer has shown the greatest staling rate of the group tested resulting in approximately 5 KgF Instron hardness after 320 hours.

In summary, the prior art formulations which incorporate only glycerin as the hydrophilic plasticizer, exhibit a high rate of water gain, which results in a chewing gum which loses its structural integrity and falls apart during chew. Additionally, large increases in water gain may result in unacceptable color and taste changes.

On the other hand, those prior art formulations which incorporate only sorbitol solution as the hydrolic plasticizer, exhibit a high rate of water loss, which translates into sorbitol recrystallization and subsequent embrittlement and increased harness (staling) in the final product.

The inventive formulations, on the contrary, exhibit a moisture exchange rate which is a compromise between the two extremes mentioned above. The result is a relatively stable chewing gum composition which maintains a relatively constant water content (a slower rate of water exchange, i.e. loss or gain) over time. The result is a final chewing gum product having prolonged stability in chew characteristics, i.e. texture, softness and taste.

TABLE II

| | Sugarless Gum - % by weight | | |
|---|---|---|---|
| | Inventive | Comparative 1 | Comparative 2 |
| Gum base | 23.0 | 23.0 | 23.0 |
| Filler | 4.0 | 2.9 | 5.0 |
| Lecithin | 0.5 | 0.5 | 0.5 |
| Sorbitol | 44.2 | 46.6 | 45.2 |
| Mannitol | 15.0 | 12.0 | 12.0 |
| *Hydrophilic plasticizer system | 11.0 | — | — |
| Glycerin | — | 13.0 | — |
| Sorbitol (70/30) solution | — | — | 12.0 |
| Flavour, spearmint blend | 1.80 | 1.50 | 1.80 |
| Color | 0.10 | 0.10 | 0.10 |
| Aspartame | 0.40 | 0.40 | 0.40 |

*Represents the following composition:
Sorbitol Sol.     8.8
Glycerin          1.65
Gelatin (100 Bloom)  0.55

EXAMPLE 3

Figure 6:
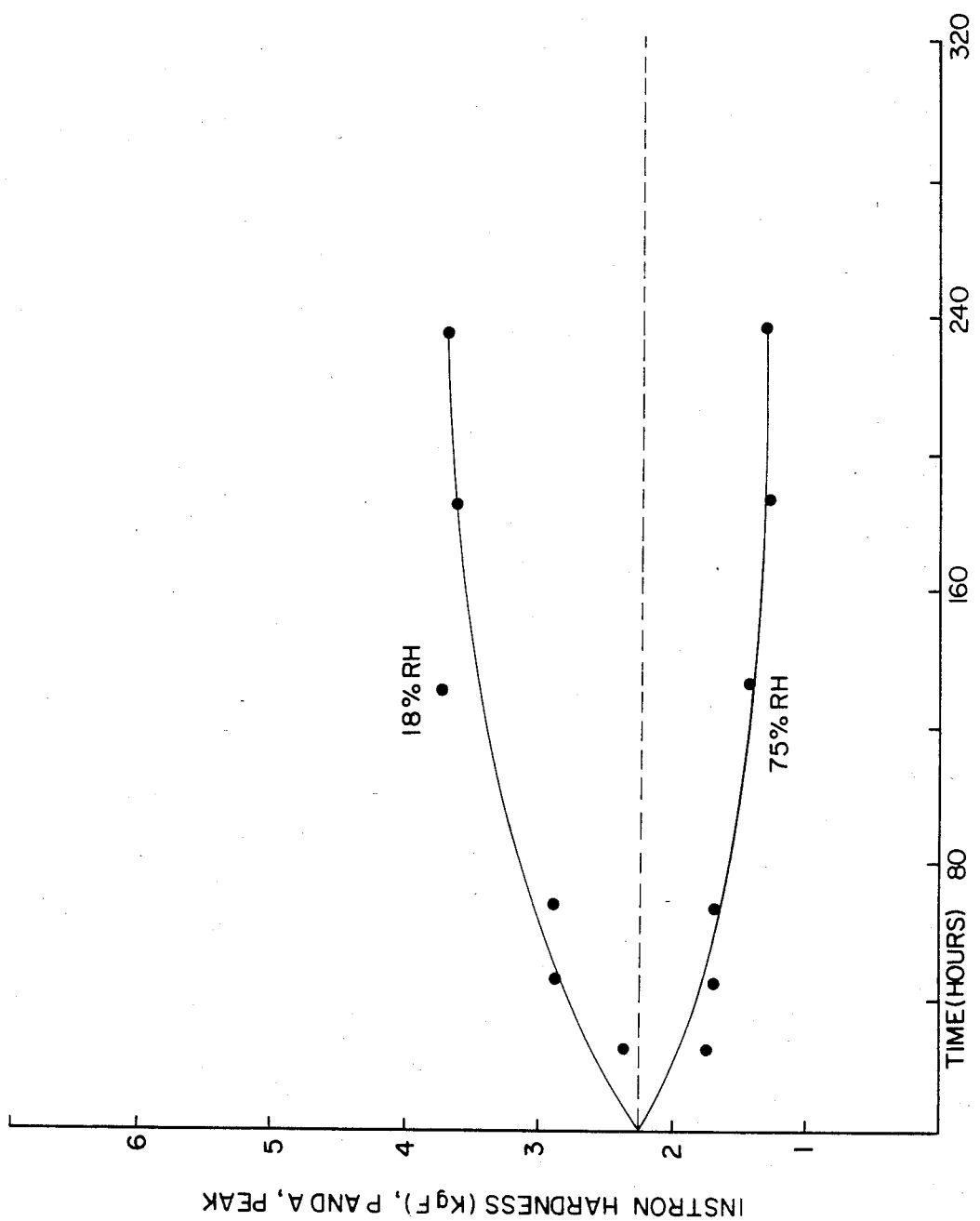
Figure 7:
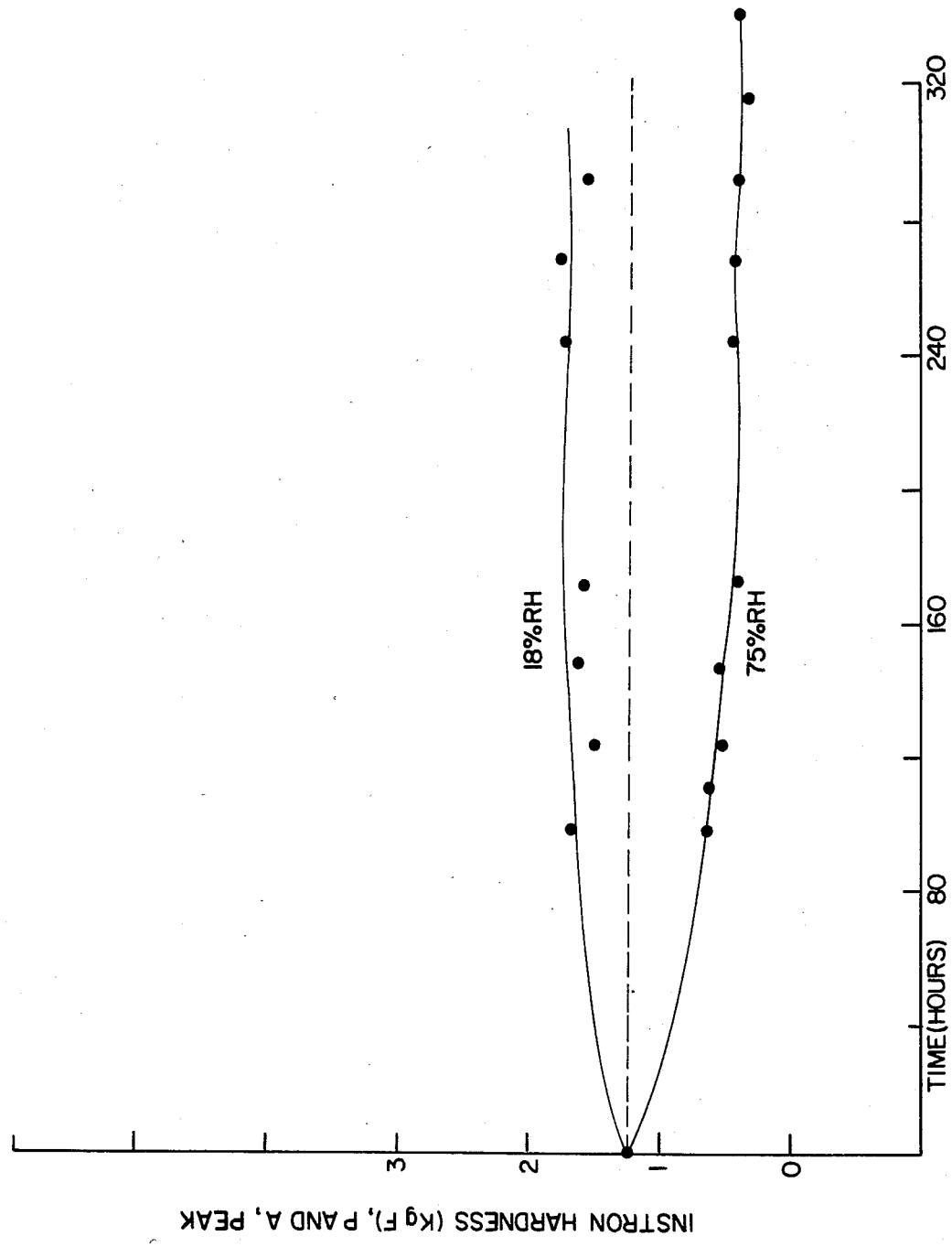
FIG. 7 represents the water exchange rate at 75% and 18% relative humidity for the inventive formulation of Example 3.

This Example is similar to Example 1 in that it compares the water exchange rate of an inventive formulation with a commercially available formulation (Dentyne ® chewing gum). The results of exposure to the identical tests of Example 1 are depicted in FIGS. 6 and 7. FIG. 6 demonstrates that the prior art Dentyne compositions employing only corn syrup as a hydrophilic plasticizer exhibit a relatively high rate of water loss and gain at low and high humidity conditions respectively. FIG. 7 covering the inventive formulation, on the other hand, shows a signficantly lower rate of water exchange, especially under the lower humidity conditions.

The formulations for the inventive and prior art comparative chewing gum compositions are given in Table III.

TABLE III

| Sugar Chewing Gum Compositions - % by weight | | |
|---|---|---|
| | Comparative | Inventive |
| Gum base | 24.00 | 26.30 |
| Corn syrup | 14.30 | |
| Pulverized sugar | 59.00 | 59.74 |
| Flavor blend | 1.70 | |
| Color | 0.20 | 0.16 |
| Lecithin | — | |
| Hydrophilic plasticizer system | — | *9.10 |
| Acetelated monoglyceride | — | 0.30 |
| Artificial sweetener | — | 1.60 |

*Comprises a premixture of:
Sorbitol solution   68%
Glycerin            20%
Gelatin             10%
Maltodextrin        2%

This invention being thus described, it will be obvious that the same may be varied in may ways. Such variations are not to be regarded as a departure from the spirit and scope of the invention and all such modifications are intended to be included within the scope of the following claims.

We claim:

1. A flexible chewing gum composition having a firm texture which comprises: a chewing gum base, sweetening agent and a premixed hydrophilic plasticizing system comprising about 20% to about 70% sorbitol, about 3 to about 50% glycerin, about 2 to about 25% gelatin and about 6 to about 25% water, all percents being by weight of the final system and, wherein the gelatin is dissolved in a solution of the sorbitol, glycerin and water prior to its addition to the chewing gum composition and the final chewing gum exhibits a balanced effect by reducing sensitivity to moisture pick-up while assuring an acceptable firm texture to the product.

2. The chewing gum composition of claim 1, wherein the hydrophilic plasticizing system contains about 55% to about 63% sorbito, about 5% to about 15% glycerin, about 5% to about 10% gelatin and about 20 to about 27% water, all percents being by weight of the hydrophilic plasticizing system, and the system is used in a sugarless chewing gum composition.

3. The chewing gum composition of claim 1, wherein the hydrophilic plasticizing system contains about 35 to about 55% sorbitol, about 20 to about 25% glycerin, about 10 to about 25% glycerin and about 15 to about 20% water, all percents being by weight of the hydrophilic plasticizing system, and the sytem is used in a sugar containing chewing gum composition.

4. The chewing gum composition of claim 1, wherein the chewing gum is a sugar or sugarless containing chewing gum composition.

5. The chewing gum composition of claim 1, wherein the gum base comprises an elastomer selected from the group consisting of natural rubber, synthetic rubber and mixtures thereof.

6. The chewing gum composition of claim 5, wherein the gum base elastomer is selected from the group consisting of chicle, jelutong, balata, gutta-percha, lechicapsi, sorva, butadiene-styrene copolymers, polyisobutylene, isobutylene-isoprene copolymers, polyethylene, polyvinylacetate, and mixtures thereof.

7. The chewing gum composition of claim 1, wherein the gum base is present in an amount of about 5% to about 60% by weight of the final chewing gum composition.

8. The chewing gum composition of claim 1, wherein the sweetening agent is selected from the group consisting of sugar, sugar alcohols and mixtures thereof.

9. The chewing gum composition of claim 1, wherein the sweetening agent is present in an amount of about 0.001% to about 90% by weight of the final chewing gum composition.

10. The chewing gum composition of claim 1, wherein the hydrophilic plasticizing system is present in an effective amount up to about 15% by weight of the final chewing gum composition.

11. The chewing gum composition of claim 1, wherein the hydrophilic plasticizing system is present in an amount of about 3 to about 15% by weight of the final chewing gum composition.

12. The chewing gum composition of claim 1, wherein the composition contains up to 5% water by weight of the final chewing gum composition.

13. The chewing gum composition of claim 1, wherein the composition is a substantially anhydrous chewing gum composition.

14. The chewing gum composition of claim 1, wherein the composition contains about 2 to about 5% water by weight of the final chewing gum composition.

15. The chewing gum composition of claim 1, wherein there is additionally included fillers, coloring agents, flavoring agents, softeners, plasticizers, and mixtures thereof.

16. The chewing gum composition of claim 15, wherein the flavoring agent is selected from the group consisting of spearmint oil, cinnamon oil, oil of wintergreen (methylsalicylate), peppermint oil, lemon oil, orange oil, grape oil, lime oil, grapefruit oil, apple essence, strawberry essence, cherry essence, pineapple essence, banana oil and mixtures thereof.

17. The chewing gum composition of claim 1, wherein the sweetening agent is selected from the group consisting of water-soluble sweetening agents, water-soluble artificial sweeteners, dipeptide based sweeteners and mixture thereof.

18. The chewing gum composition of claim 17, wherein the sweetening agent is selected from the group consisting of saccharin acid, saccharin salts, cyclamate salts, acesulfame-K, L-aspartyl-L-phenylalanine methyl ester, xylose, ribose, glucose, mannose, galactose, fructose, dextrose, sucrose, sugar, maltose, partially hydrolyzed starch or corn syrup solids, sorbitol, xylitol, mannitol; talin, dihydrochalcone; glycyrrhizin; stevia rebaudiana (stevioside); sucralose and mixtures thereof.

19. A hydrophilic plasticizing system which comprises a solution wherein gelatin is dissolved in a solution of sorbitol, glycerin and water and wherein the system contains about 20 to about 70% sorbitol, about 3 to about 50% glycerin, about 2 to about 25% gelatin and about 6 to about 25% water, all percents being by weight of the final system.

20. The hydrophilic plasticizing system of claim 19 wherein the system is in a gelled or flowable physical state.

* * * * *